(12) United States Patent
Batog et al.

(10) Patent No.: US 8,924,691 B2
(45) Date of Patent: Dec. 30, 2014

(54) SOFTWARE PIPELINING (75) Inventors: Bogdan Batog, Bucharest (RO); Dragos Badea, Bucharest (RO)

(73) Assignee: Freescale Semiconductor, Inc., Austin, TX (US)

( * ) Notice: Subject to any disclaimer, the term of this patent is extended or adjusted under 35 U.S.C. 154(b) by 1632 days.

(21) Appl. No.: 12/280,478

(22) PCT Filed: Feb. 24, 2006

(86) PCT No.: PCT/EP2006/001967
§ 371 (c)(1),
(2), (4) Date: Aug. 22, 2008

(87) PCT Pub. No.: WO2007/095968
PCT Pub. Date: Aug. 30, 2007

(65) Prior Publication Data
US 2009/0260015 A1    Oct. 15, 2009

(51) Int. Cl.
G06F 9/30    (2006.01)
G06F 9/40    (2006.01)
G06F 15/00   (2006.01)
G06F 9/45    (2006.01)

(52) U.S. Cl.
CPC .................................. G06F 8/4452 (2013.01)
USPC ....................................................... 712/216

(58) Field of Classification Search
None
See application file for complete search history.

(56) References Cited

U.S. PATENT DOCUMENTS

| 5,530,866 | A | 6/1996 | Koblenz et al. | |
| 6,305,014 | B1 | 10/2001 | Roediger et al. | |
| 6,651,247 | B1 * | 11/2003 | Srinivasan | 717/161 |
| 6,738,966 | B1 * | 5/2004 | Tanaka | 717/140 |
| 7,058,938 | B2 * | 6/2006 | Stringer | 717/161 |
| 7,930,688 | B2 * | 4/2011 | Martin et al. | 717/161 |

OTHER PUBLICATIONS

PCT/EP2006/001967 Search Report and Written Opinion, Sep. 21, 2006.
Rau, B. Ramakrishna, "Iterative Modulo Scheduling: An Algorithm for Software Pipelining Loops", 27th Annual Int'l Symposium on Microarchitecture, Nov. 1994, 12 pages, HP Labs ACM 0-89791-707-3, California.
Zalamea, J., et al "Register Constrained Modulo Scheduling", May 2004, 14 pages, IEEE Transactions on Parallel and Distributed Systems, vol. 15, No. 5.

* cited by examiner

Primary Examiner — Corey S Faherty (57) ABSTRACT

A software pipelining method for generating a schedule for executing a plurality of instructions on a processor, the plurality of instructions involving one or more variables, the processor having one or more physical registers, the method comprising the step of scheduling each of the plurality of instructions, determining whether there is a variable for which there is less than a threshold number of physical registers to which that variable may be allocated, and unscheduling a currently scheduled instruction when there is a variable for which there is less than the threshold number of a physical registers to which that that variable may be allocated.

20 Claims, 5 Drawing Sheets

SOFTWARE PIPELINING

FIELD OF THE INVENTION

This invention relates to a software pipelining method. This invention also relates to an apparatus arranged to carry out the software pipelining method and to a computer program which carries out the software pipelining method.

BACKGROUND OF THE INVENTION

There are several methods of making a set of processor instructions run faster on a processor, one of which is software pipelining. In software pipelining, a schedule for executing the instructions is produced. This schedule may place several instructions for execution at the same clock cycle, i.e. in parallel. Such parallel execution is valid provided that the instructions which are executed in parallel do not need to use the same resources, such as buses, at the same time is (known as a resource conflict). Additionally, such parallel execution is valid provided that the data dependencies of the instructions are not violated, an example violation being two instructions trying to update the value of a register at the same time.

One particular software pipelining method is known as iterative modulo scheduling and is described in detail in the paper "Iterative Modulo Scheduling", Rau, Hewlett-Packard Laboratories, ACM 0-89791-707-3/94/0011. An overview of iterative module scheduling is given below. It will be appreciated, though, that this is not a complete description of iterative modulo scheduling; rather it is a sufficient description to provide context for embodiments of the present invention.

Iterative modulo scheduling is a method suited to scheduling a loop of instructions, the loop having a number of iterations. The aim of iterative modulo scheduling is to generate an instruction schedule for one loop iteration such that the schedule may be applied repeated without causing any resource conflicts and without violating any data dependencies. The repeated use of this schedule then implements the loop of instructions.

Figure 1:
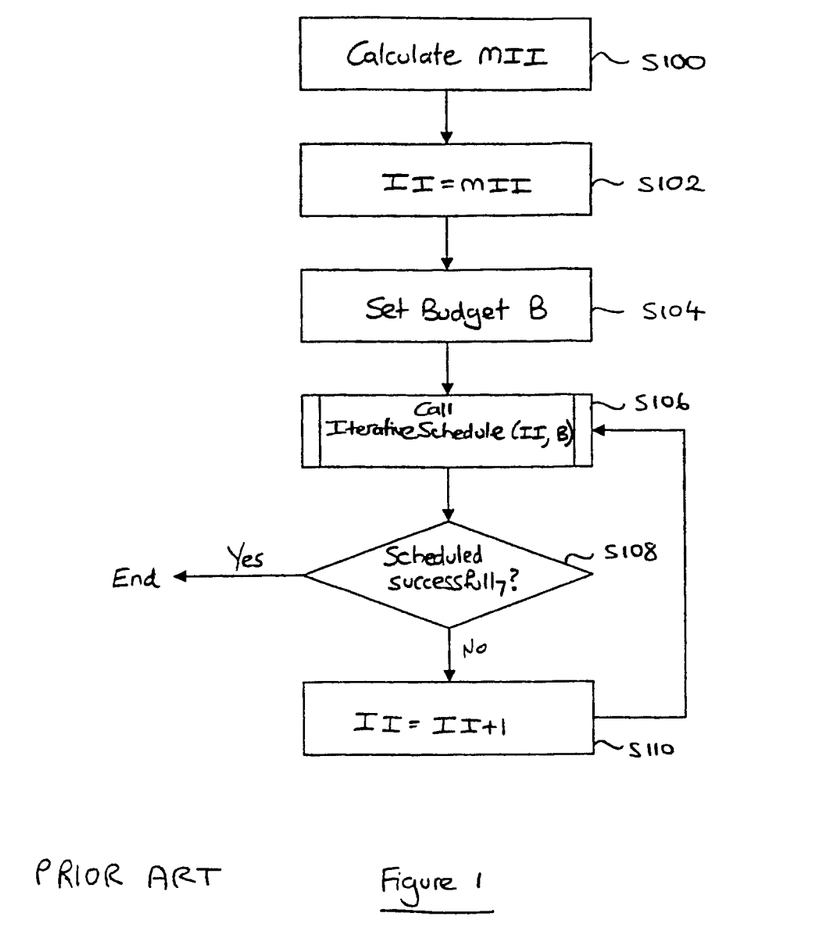
FIG. 1 is a flowchart showing a high-level overview of iterative modulo scheduling.

FIG. 1 of the accompanying drawings is a flowchart showing a high-level overview of iterative modulo scheduling.

The time between successive implementations of the schedule by the processor is known as the initiation interval II. The unit of time is clock cycles. The smaller the initiation interval II, the faster the execution of the loop by the processor. Therefore, at a step S100, a lower bound for the initiation interval II is calculated. This lower bound is known as the minimum initiation interval MII. The calculation of the minimum initiation interval MII will not be described in detail here (as it is not important to the invention), although, in summary, the minimum initiation interval MII takes into account:

(i) for each resource used by instructions of the loop, such as a bus, the usage requirements of that resource by the instructions of the loop; and (ii) the data dependencies and control-flow dependencies of the various instructions of the loop.

At a step S102, the initiation interval II is set to be the minimum initiation interval MII.

At a step S104, a budget value B is initialized. The budget value B is used to control how long the iterative modulo scheduling method should spend trying to schedule the instructions so that one loop iteration can be executed within the current initiation interval II. For example, the budget value B could be proportional to the number of instructions making up a loop iteration.

At a step S106, a function IterativeSchedule is called, with the current initiation interval II and the budget value B as parameters. The function IterativeSchedule attempts to schedule the instructions of a loop iteration so that a loop iteration can be executed within the current initiation interval II. This will be described in more detail with reference to FIG. 2 of the accompanying drawings.

At a step S108, the result of the function IterativeSchedule is tested. If the function IterativeSchedule returns a value of TRUE, indicating that a schedule has been found, then the iterative modulo scheduling is complete. Otherwise, if the function IterativeSchedule returns a value of FALSE, then a schedule has not been found for the current initiation interval II and processing continues at a step S110.

At the step S110, the initiation interval II is incremented (since scheduling with the current initiation interval II was unsuccessful). Processing then returns to the step S106, so that an attempt can be made to schedule the instructions using the new initiation interval II.

Figure 2:
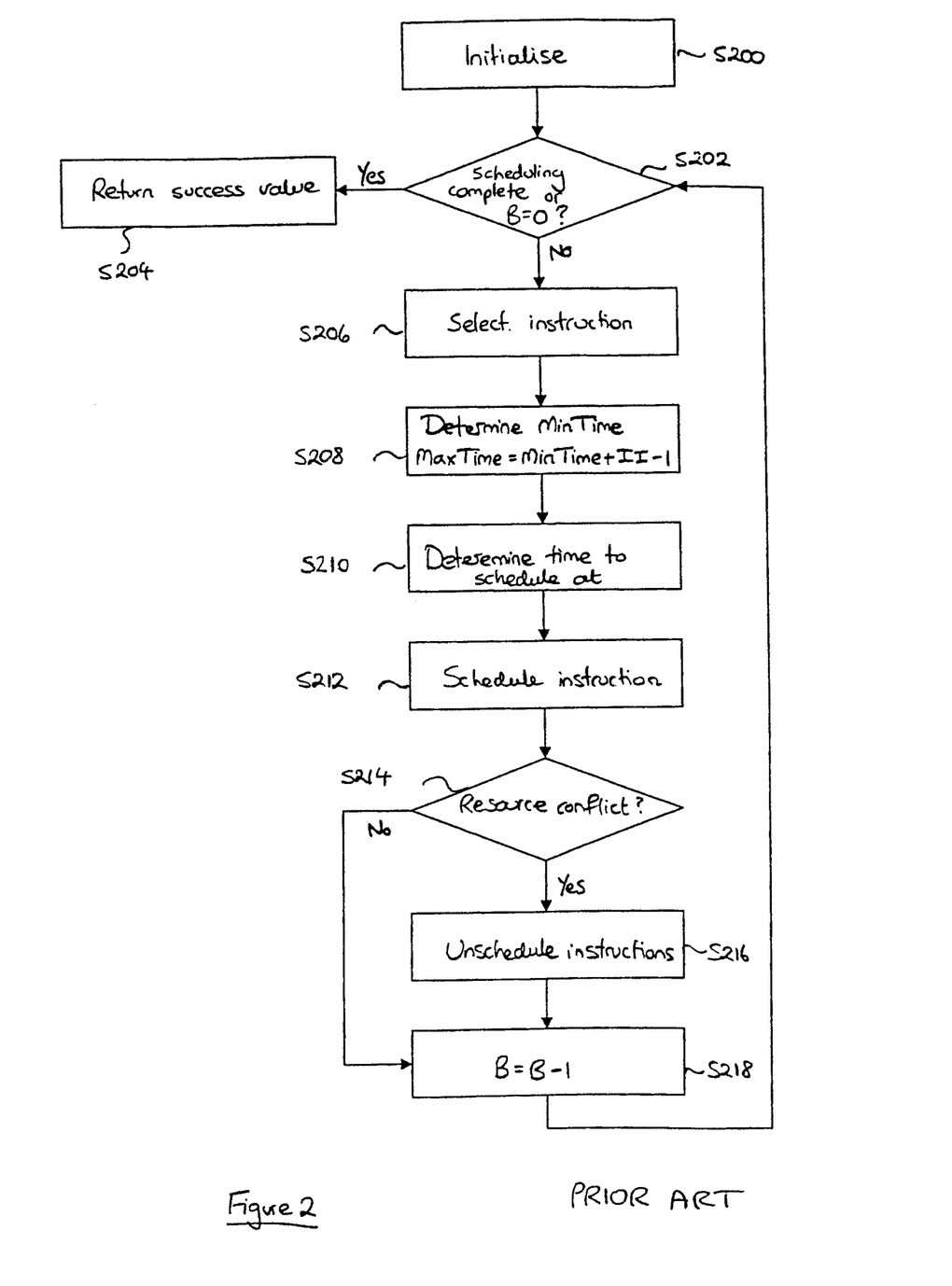
FIG. 2 is a flowchart showing the processing performed in an attempt to schedule the instructions for a loop iteration.

FIG. 2 of the accompanying drawings is a flowchart showing the processing performed by the function IterativeSchedule as it attempts to schedule the instructions for a loop iteration so that a loop iteration may be executed within the current initiation interval II. The function IterativeSchedule has input parameters of (i) the current initiation interval II under test and (ii) the budget value B. The function IterativeSchedule returns a value of TRUE if a schedule has been found for the instructions of a loop iteration and returns a value of FALSE if a schedule has not been found for the instructions of a loop iteration.

At a step S200, the function IterativeSchedule initializes. In particular, for each instruction to be scheduled, an associated flag, NeverScheduled, is set to indicate that that instruction has never been scheduled during this current call of the function IterativeSchedule.

Furthermore, for each instruction, an associated variable, PreviousScheduleTime, is set. This variable PreviousScheduleTime indicates the time within the initiation interval II at which an instruction was previously scheduled. As none of the instructions have yet been scheduled during this call to the function IterativeSchedule, these variables PreviousScheduleTime are initialized with the value of 0.

Additionally, each of the instructions is given a priority such that the function IterativeSchedule will attempt to schedule a first instruction with priority $P_1$ before it attempts to schedule a second instruction with priority $P_2$ if $P_1 > P_2$. There are a variety of methods for assigning the priorities to the instructions. For example, an instruction that is dependent on the execution of an instruction in a previous iteration of the loop may be given priority over an instruction that is not dependent in this manner.

At a step S202, the function IterativeSchedule determines whether (i) the scheduling has been completed (i.e. whether all of the instructions have been successfully scheduled) or (ii) the budget value B has a value of 0 (indicating that the function IterativeSchedule should "give up" trying to schedule the instructions within the current initiation interval II). If either of these two conditions are satisfied, then processing continues at a step S204, at which the function IterativeSchedule ends by returning either a value of TRUE if a schedule has been found for all of the instructions of a loop iteration or a value of FALSE if a schedule has not been found for all of the instructions of a loop iteration.

Otherwise, processing continues at a step S206 at which the highest priority unscheduled instruction is selected for scheduling.

At a step S208, the function IterativeSchedule determines the earliest time MinTime at which the selected instruction can be scheduled. The time MinTime may actually be greater than the initiation interval II, in which case the selected instruction is scheduled for execution within the next loop iteration. The function IterativeSchedule determines the time MinTime by examining each predecessor instruction (a predecessor instruction being a currently scheduled instruction on which the selected instruction has a dependency), and determining when the selected instruction may be scheduled. This is based on (i) when the predecessor instruction is scheduled for execution and (ii) the delay required between starting execution of the predecessor instruction and starting execution of the selected instruction to avoid any dependency violations.

A latest time MaxTime at which the selected instruction can be scheduled is then calculated. The value of MaxTime is set to be MaxTime=MinTime+II−1.

At a step S210, the function IterativeSchedule determines a time between MinTime and MaxTime at which the selected instruction is to be scheduled. This is done by determining the earliest time between MinTime and MaxTime at which the selected instruction may be scheduled without causing a resource conflict with an already scheduled instruction.

If a time between MinTime and MaxTime at which the selected instruction may be scheduled without a resource conflict does not exist, then the time at which to schedule the selected instruction is set as follows. If the selected instruction has never been scheduled before (as indicated by the associated flag NeverScheduled) or if MinTime is greater than the previous time at which the selected instruction was scheduled (as indicated by the variable PreviousScheduleTime associated with the selected instruction) then the time at which to schedule the selected instruction is set to be MinTime. Otherwise, the time at which to schedule the selected instruction is set to be the next clock cycle after the time indicated by the associated variable PreviousScheduleTime.

At a step S212, the selected instruction is scheduled for execution at the time determined at the step S210. The flag NeverScheduled associated with the selected instruction is set to FALSE, and the variable PreviousScheduleTime associated with the selected instruction is set to be the time determined at the step S210.

At a step S214, the function IterativeSchedule determines whether, having scheduled the selected instruction, a resource conflict exists between the newly scheduled instruction and one or more of the instructions that have already been scheduled. If such a resource conflict exists, then processing continues at a step S216; otherwise, processing continues at a step S218.

At the step S216, the one or more instructions which have a resource conflict with the newly scheduled instruction are unscheduled. There is now no resource conflict in the existing schedule. Other instructions may be unscheduled too.

At the step S218, the budget value B is decremented by 1. The function IterativeSchedule then returns to the step S202.

Software pipelining, as described above, works well on architectures such as those found in personal computers (PCs) which have a large number of registers that can be used in a flexible manner. However, for more constrained architectures, the advantages gained by software pipelining can be significantly reduced. For example, following the generation of an instruction schedule, a process of register allocation is performed which attempts to allocate physical registers to variables. It is possible that the software pipelining may produce an instruction schedule such that the subsequent register allocation forces a variable to be stored in a memory rather than storing the variable in a register. This may be due to the architectural constraints of the particular processor being used. As accessing a memory is generally slower than accessing a register, the overall execution speed of the instructions is reduced. It would therefore be desirable to have software pipelining methods better suited to such constrained architectures.

SUMMARY OF THE INVENTION

According to a first aspect of the invention, there is provided a method according to the accompanying claims.

According to a second aspect of the invention, there is provided an apparatus according to the accompanying claims.

According to a third aspect of the invention, there is provided a computer program according to the accompanying claims.

BRIEF DESCRIPTION OF THE DRAWINGS

Embodiments of the invention will now be described, by way of example only, with reference to the accompanying drawings, in which.

DETAILED DESCRIPTION OF THE PREFERRED EMBODIMENTS

Figure 3:
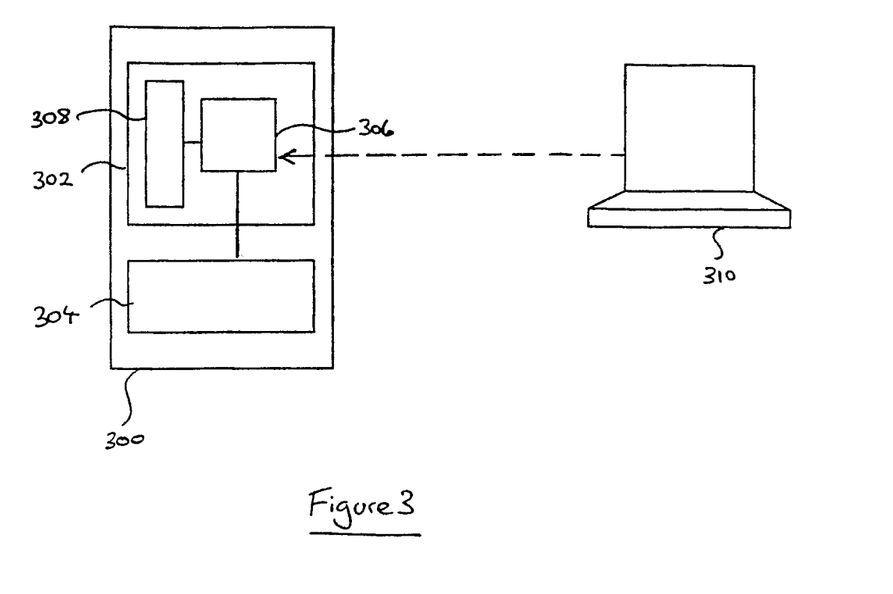
FIG. 3 schematically illustrates a processing system.
Figure 4:
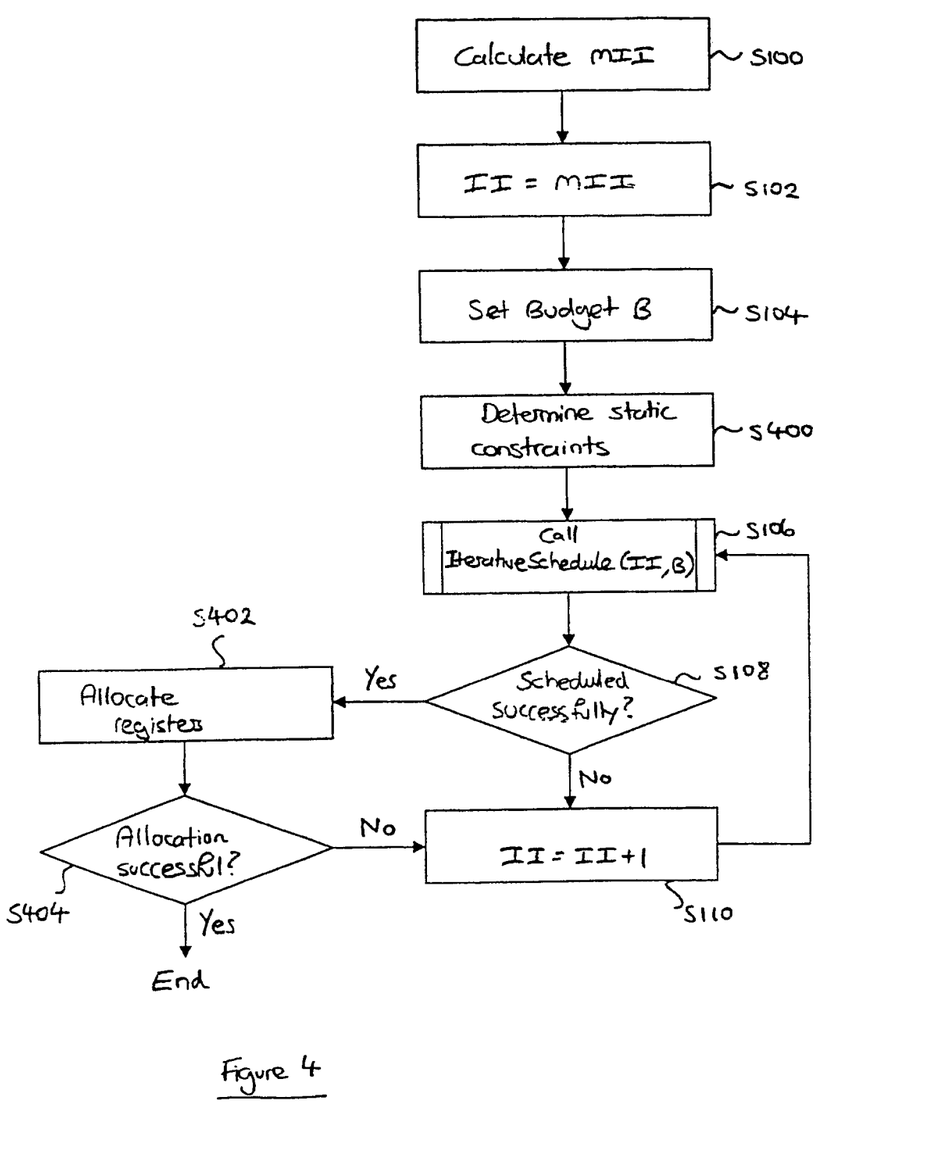
FIG. 4 is a flowchart showing a high-level overview of iterative modulo scheduling according to an embodiment of the invention.
Figure 5:
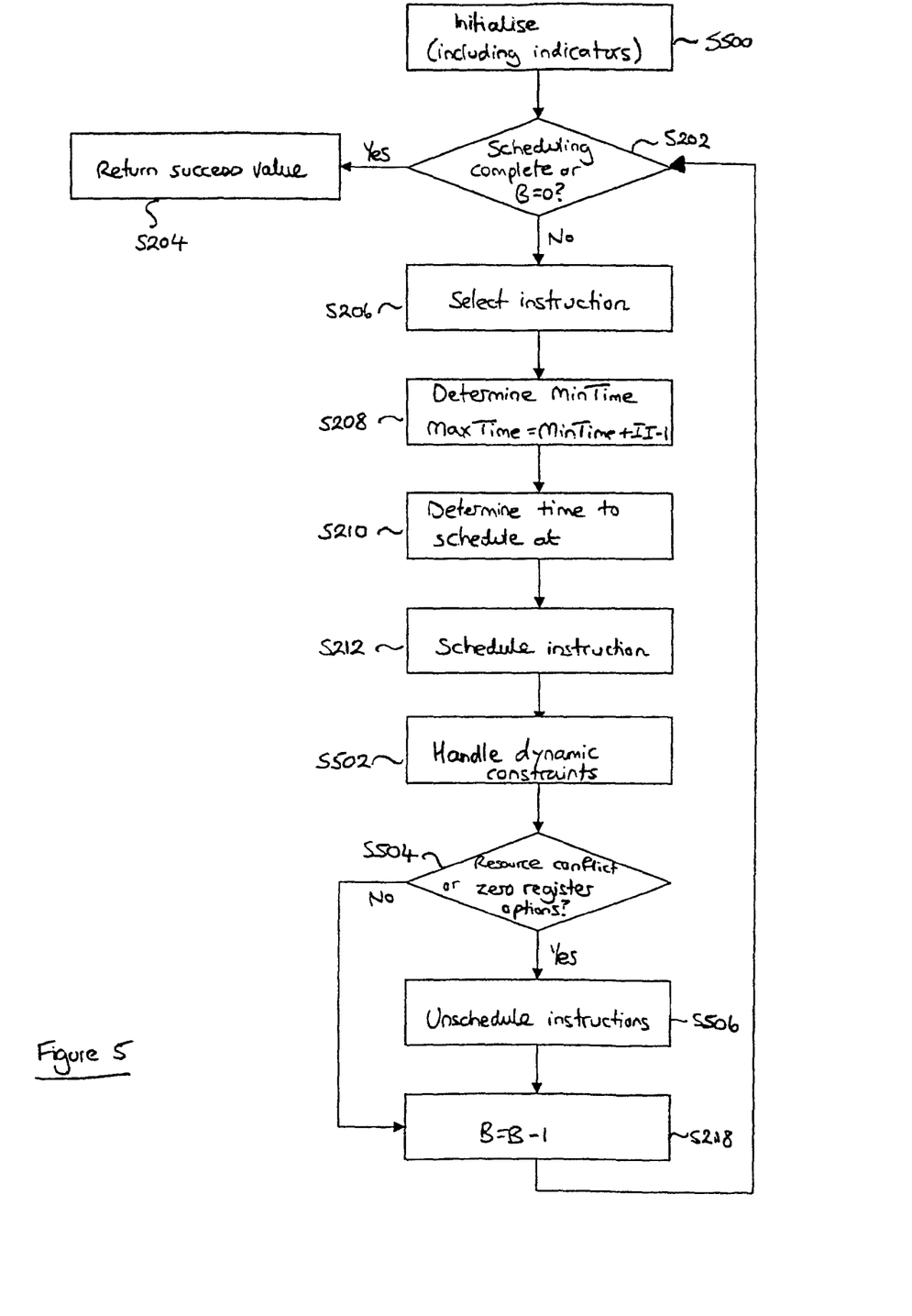
FIG. 5 is a flowchart illustrating the processing performed in an attempt to schedule the instructions for a loop iteration according to an embodiment of the invention.

In the description that follows and in FIGS. 3-5, certain embodiments of the invention are described. However, it will be appreciated that the invention is not limited to the embodiments that are described and that some embodiments may not include all of the features that are described below.

FIG. 3 schematically illustrates a processing system. A data processing apparatus 300 has a processor 302 and a memory 304. The processor 302 comprises a central processing unit (CPU) 306 and a bank of one or more physical registers 308.

The CPU 306 runs software (or firmware) produced by a computer 310. A user of the computer 310 prepares a list of program instructions for execution by the processor 302 (via its CPU 306). The computer 310 then converts these instructions into a suitable form for execution by the processor 302, which may include compiling the instructions into machine readable code. Additionally, the computer 310 may perform various optimizations. One such optimization is software pipelining, which schedules one or more instructions for execution at the same time (i.e. parallel with each other). The computer 310 runs one or more computer programs which generates the software to be executed by the processor 302 from the set of program instructions. One of these computer programs may perform the software pipelining.

Once the software has been prepared by the computer 310, the processor 302 is configured to run the software (for example, by downloading the software to the CPU 306).

The program instructions may involve one or more virtual registers (also known as variables). A virtual register may be an input operand for an instruction or may be an output result from the instruction. The values of these virtual registers may be stored in the bank of physical registers 308 or the memory 304. The CPU 306 can access the physical registers 308 faster than it can access the memory 304. Therefore, it is preferable for the virtual registers to all be stored using the bank of physical registers 308 rather than using the memory 304, as doing so will increase the speed at which the processor 302 can execute the instructions. Therefore, as will be described below, the software pipelining, performed by the computer 310 when preparing a schedule for the processor 302 to execute the instructions, attempts to ensure that each of the virtual registers can be allocated to a physical register 308, i.e. the virtual registers are not allocated to a location in the memory 304.

However, given the specific architecture of the processor 302, there may be various constraints on the allocation of virtual registers to physical registers 308. The software pipelining performed by the computer 310 preferably takes these constraints into account. There are primarily two types of registers constraint: static register constraints and dynamic register constraints.

Static register constraints arise due the architecture of the processor 302 allowing only a subset of the bank of physical registers 308 to be allocated to a virtual register if a specific instruction involves (operates on or outputs to) that virtual register. For example, the bank of physical registers 308 may comprise ten individual physical registers $R_1 \ldots R_{10}$. However, if a given instruction involving two virtual registers $VR_1$ and $VR_2$ is used, then the architecture of the processor 302 may be such that, for this instruction, the first virtual register $VR_1$ can only be allocated to physical registers $R_1 \ldots R_8$ whilst the second virtual register $VR_2$ can only be allocated to physical registers $R_5$, $R_6$ and $R_9$.

Different instructions (which may involve different numbers of virtual registers) may have different static constraints according to the architecture of the processor 302.

Dynamic register constraints arise during the software pipelining process itself when the process of generating the instruction schedule places two or more instructions for execution by the processor 302 at the same time. The processor 302 may use 16bits to describe the instructions to be executed at a clock cycle (although it will be appreciated that other numbers of bits could be used instead). If a single instruction is to be scheduled for execution at a given clock cycle, then the full 16bits can be used to both specify the instruction and identify which physical registers 308 the instruction involves. However, if two instructions are to be scheduled for execution at a given clock cycle, then a reduced number of bits may be used to describe each of the instructions. For example, for each instruction, only 8bits may be used to specify the instruction and identify which physical registers 308 the instruction involves. There is, therefore, less data capacity to specify the physical registers 308 which may be used for either instruction. Therefore, the number of physical registers 308 which each instruction may use is constrained.

For example the bank of physical registers 308 may comprise ten individual physical registers $R_1 \ldots R_{10}$. A first instruction may be:

mac $VR_1, VR_2, VR_3$ which multiplies the virtual registers $VR_1$ and $VR_2$ and adds the result of this multiplication to the virtual register $VR_3$. When this instruction is to be executed without any other instruction being executed at the same time, then the architecture of the processor 302 may, due to the static constraints, allow the virtual register $VR_3$ to be allocated to any physical register 308 in the subset of physical registers $R_1 \ldots R_4$.

Consider now a second instruction:

move.w x: $(VR_4)+,VR_5$ which loads a value from a memory location pointed to by the virtual register $VR_4$ into the virtual register $VR_5$ and then increments the value of the virtual register is $VR_4$. When this second instruction is scheduled for execution by the processor 302 at the same time as the first instruction, then, due to the now limited bit-width available to describe both instructions at the same time, the virtual register $VR_3$ may only be allocated to physical registers $R_1$ and $R_2$ instead of the whole subset of physical registers $R_1 \ldots R_4$.

It will be appreciated that there are other possible causes of dynamic register constraints and that these may also result in limiting, during the scheduling, the possible physical registers 308 to which a virtual register VR may be allocated.

FIGS. 4 and 5 are flowcharts illustrating how an embodiment of the invention, using modulo iterative scheduling, performs software pipelining such that the static register constraints and the dynamic register constraints are catered for. In this way, the software pipelining attempts to schedule the instructions whilst ensuring that each virtual register has at least one option out of the physical registers 308 to which it may be allocated, i.e. the memory 304 is not needed for the virtual registers.

FIG. 4 is a flowchart showing a high-level overview of iterative modulo scheduling according to an embodiment of the invention. This is similar to the flowchart shown in FIG. 1, and the steps that the two flowcharts have in common are represented by the same reference numeral. However, the flowchart shown in FIG. 4 involves a number of additional steps, as described below.

In order to handle the static register constraints, at a step S400, the static constraints for the set of instructions to be scheduled are determined. This step S400 is illustrated in FIG. 4 as occurring after the step S104 at which the budget value B is set. However, it will be appreciated that the step S400 for determining the static constraints may occur at any point during the initialization of the iterative modulo scheduling, for example, at any point before or after any of the steps S100, S102 and S104.

At the step S400, for each virtual register VR, a list of static constraints StaticOptions[VR] is determined. The list of static constraints StaticOptions[VR] serves as an indicator of which physical registers 308 the virtual register VR may be allocated to, having regard to the static constraints. The list of static constraints StaticOptions[VR] may take the form of a list of Boolean values, with one value for each possible physical register 308. Alternatively, the list of static constraints StaticOptions[VR] may take the form of a numeric value, with each bit position of the numeric value indicating whether or not a corresponding physical register 308 is available for allocation of the virtual register VR, having regard to the static constraints.

At the step S400, the list of static constraints StaticOptions[VR] for a virtual register VR is initialized by determining, for each of the instructions that involves that virtual register VR, which of the physical registers 308 the architecture of the processor 302 allows the virtual register VR to be allocated to. The list of static constraints StaticOptions[VR] is set to indicate that a physical register 308 is available for allocation to the virtual register VR only if all of the instructions that involve that virtual register VR may use that physical register 308 for that virtual register VR.

For example, consider the following set of instructions and static constraints imposed by the architecture of the processor 302 on the virtual registers involved in the instructions:

| Instruction | Virtual registers involved in that instruction | Static constraints for each virtual register involved with that instruction |
|---|---|---|
| Instr1 | $VR_1, VR_2$ | $VR_1$ may be allocated to $R_1 \ldots R_4$ |
| | | $VR_2$ may be allocated to $R_1 \ldots R_3$ and $R_9$ |
| Instr2 | $VR_1, VR_2, VR_3$ | $VR_1$ may be allocated to $R_1 \ldots R_{10}$ |
| | | $VR_2$ may be allocated to $R_1 \ldots R_9$ |
| | | $VR_3$ may be allocated to $R_1 \ldots R_4$ and $R_1 \ldots R_{10}$ |
| Instr3 | $VR_2, VR_3$ | $VR_2$ may be allocated to $R_2 \ldots R_{10}$ |
| | | $VR_3$ may be allocated to $R_3 \ldots R_9$ |

In this situation, the lists of static constraints would be initialized as follows:

StaticOptions[$VR_1$]={$R_1 \ldots R_4$}
as the only instructions involving the virtual register $VR_1$ are Instr1 and Instr2, and the only physical registers 308 which both Instr1 and Instr2 are able to use for the virtual register $VR_1$ are $R_1 \ldots R_4$.

StaticOptions[$VR_2$]={$R_2, R_3, R_9$}
as the instructions involving the virtual register $VR_2$ are Instr1, Instr2 and Instr3 and the only physical registers 308 which all of Instr1, Instr2 and Instr3 are able to use for the virtual register $VR_2$ are $R_2, R_3$ and $R_9$.

StaticOptions[$VR_3$]={$R_3, R_4, R_7 \ldots R_9$}
as the only instructions involving the virtual register $VR_3$ are Instr2 and Instr3, and the only physical registers 308 which both Instr2 and Instr3 are able to use for the virtual register $VR_3$ are $R_3, R_4$, and $R_7 \ldots R_9$.

At the step S106, the function IterativeSchedule is called. FIG. 5 is a flowchart illustrating the processing performed by the function IterativeSchedule according to an embodiment of the invention. This is similar to the flowchart shown in FIG. 2, and the steps that the two flowcharts have in common are represented by the same reference numeral. However, the flowchart shown in FIG. 5 involves a number of additional steps, as described below.

The initializing step S200 of FIG. 2 has been replaced by an initializing step S500 in FIG. 5. At the step S500, the same initialization is performed as at the step S200. However, additional initialization is performed.

For each of the virtual registers VR involved in the instructions for an iteration of a program loop, the function IterativeSchedule stores and maintains a list of options Options[VR]. The list of options Options[VR] serves as an indicator indicating which of the physical registers 308 the virtual register VR may be allocated to. This indicator takes into account both the static constraints and any dynamic constraints which may have arisen during the scheduling of the instructions. The list of options Options[VR] may take the form of a list of Boolean values, with one value for each possible physical register 308. Alternatively, the list of options Options[VR] may take the form of a numeric value, with each bit position of the numeric value indicating whether or not a corresponding physical register 308 is available for allocating the virtual register VR.

At the step S500, the list of options Options[VR] for each virtual register VR is initialized to be the list of static constraints StaticOptions[VR] for that virtual register VR.

The processing of the function IterativeSchedule continues as described with reference to FIG. 2. However, at a step S502 after the step S212 at which a selected instruction has been scheduled, the function IterativeSchedule handles various dynamic constraints. In particular, the function IterativeSchedule determines whether there are any currently scheduled instructions which are now scheduled for execution at least in part in parallel with the selected instruction. For each instruction which is currently scheduled to be executed, at least in part, in parallel with the selected instruction, the dynamic constraints imposed by executing that instruction in parallel with the selected instruction are considered. The list of options Options[VR] for a virtual register VR is updated to reflect any dynamic constraints on that virtual register VR that may exist, for example due to the parallel execution of two or more instructions, with one of the instructions involving that virtual register VR.

For example, with the previous example of scheduling the move.w instruction for execution at the same time as the mac instruction, the list of options for the virtual register $VR_3$ before scheduling the move.w instruction is Options[$VR_3$]={$R_1 \ldots R_4$}. However, after scheduling the move.w instruction, the list of options for the virtual register $VR_3$ is updated to be Options[$VR_3$]={$R_1, R_2$} due to the dynamic constraint of scheduling the move.w instruction for parallel execution with the mac instruction.

Processing continues at a step S504 (in place of the step S214 of FIG. 2), at which the function IterativeSchedule determines whether there is either a resource conflict or whether there is a virtual register VR for which the list of options Options[VR] indicates that there are no physical registers 308 to which that virtual register VR may be allocated. This second condition is the same as the function IterativeSchedule checking whether there is a virtual register VR for which there is less than a threshold number of physical registers 308 to which that virtual register may be allocated. In this embodiment, the threshold value is 1; other threshold values are discussed later. If either of these conditions are satisfied, then processing continues at a step S506 (in place of the step S216 of FIG. 2); otherwise, processing continues at the step S218.

At the step S506, the function IterativeSchedule unschedules one or more instructions as has been described with reference to the step S216 of FIG. 2. However, in order to preserve a correct list of options Options[VR] for each virtual register VR, at the step S506 the following operations are performed. First, the list of options Options[VR] for each virtual register VR is re-initialized to the list of static constraints StaticOptions[VR]. This may be performed for all virtual registers VR. Alternatively, this may be performed for just the virtual registers VR involved with instructions that have been unscheduled, or which are involved with instructions scheduled for the same clock cycle as an instruction that has been unscheduled. Then, for each of the remaining scheduled instructions, the function IterativeSchedule updates the list of options Options[VR] for each re-initialized virtual register VR according to any dynamic constraints that may exist, for example, due to two or more instructions still being scheduled for execution at the same time. This is done in the same manner as at the step S502.

Once the function IterativeSchedule has successfully generated an instruction schedule, then, as shown in FIG. 4, processing continues at a step S402. At the step S402, the software pipelining attempts to allocate a physical register 308 to each of the virtual registers VR in such a way that a physical register 308 is allocated to at most one virtual register VR. This may be performed according to any know allocation technique.

It is possible that the function IterativeSchedule generates an instruction schedule for which it is not possible to allocate, to each virtual register VR, a physical register 308 to which no other-virtual register VR is to be allocated. For example, for virtual registers $VR_1$, $VR_2$ and $VR_3$, it is possible for the function IterativeSchedule to generate an instruction schedule such that Options[$VR_1$]={$R_1$}, Options[$VR_2$]={$R_1$} and Options[$VR_3$]={$R_1$}. None of the lists of options Options [VR] for these three virtual registers $VR_1$, $VR_2$ and $VR_3$ indicate that there are no physical registers 308 to which they may be allocated. However, it is not possible to allocate, to each of the virtual registers $VR_1$, $VR_2$ and $VR_3$ a physical register 308 to which none of the other virtual registers is to be allocated, since the only allocation option for each of the virtual registers $VR_1$, $VR_2$ and $VR_3$ is the physical register $R_1$.

Therefore, at the step S404, the software pipelining determines whether the register allocation at the step S402 has been successful, i.e. whether each virtual register VR has been allocated to a physical register 308 to which no other virtual register VR has been allocated. If the register allocation has not been successful, then processing continues at the step S110; otherwise, the software pipelining has been completed.

It will be appreciated that a number of alternatives embodiments of the invention are possible. For example, at the step S502 at which the function IterativeSchedule handles dynamic constraints, a test may be made to determine whether any of the lists of options Options[VR] for a virtual register VR indicates that there are no physical registers 308 to which that virtual register VR may be allocated. If there is such a virtual register VR, then the function IterativeSchedule may simulate the existence of a resource conflict (for example, by setting an appropriate flag). Then, the step S504 could be the same as the step S214 of FIG. 2, at which the function IterativeSchedule only tests for the existence of a resource conflict.

It is possible that, for a particular list of instructions and for a particular architecture for the processor 302, the list of static constraints StaticOptions[VR] for a virtual register VR may be empty, i.e. there may be no physical registers 308 to which the virtual register VR may be allocated whilst conforming to all of the static constraints simultaneously. As such, embodiments of the invention may test for this condition at the step S400. If this situation arises, then embodiments of the invention may add additional instructions to the set of instructions to be scheduled. For example, an instruction to move a value between two registers may be included and may avoid a complete conflict between the static constraints.

It will also be appreciated that, at the step S504, the function IterativeSchedule may test whether the list of Options [VR] for a virtual register VR indicates that there is less than a threshold number of physical registers 308 to which that virtual register VR may be allocated and, if the number of physical registers 308 is below the threshold, processing would continue at the step S506. If the threshold is 1, then this is equivalent to checking whether there is a virtual register VR to which no physical registers 308 may be allocated. Embodiments may use thresholds greater than 1 instead. Whilst such thresholds may make the scheduling more difficult, the subsequent allocation of virtual registers VR to physical registers 308 at the step S402 is more likely to be successful.

It will be appreciated that, whilst an embodiment of the invention has been described with reference to iterative modulo scheduling, embodiments of the invention may make use of other software pipelining methods that involve the steps of scheduling and unscheduling instructions. In particular, an instruction schedule produced during any software pipelining method may be assessed by maintaining and monitoring the possible options for allocating each virtual register VR to a physical register 308, so that, if, during the schedule generation, a virtual register VR no longer has any options for allocation to a physical register 308, then the current schedule being generated may be deemed unsuitable.

It will be appreciated that, insofar as embodiments of the invention are implemented by a computer program, then a storage medium and a transmission medium carrying the computer program form aspects of the invention.

Thus, one of the advantages of the present invention is that a set of program instructions may be scheduled in a way that attempts to ensure that each of the variables involved with the instructions may be allocated to a physical register. This avoids any unnecessary use of memory, the access to which is generally slower than accessing physical registers. As such, the benefits gained by software pipelining are not hindered by having to use memory rather than physical registers.

Embodiments of the invention therefore provide a software pipelining is method that attempts to ensure that the schedule produced for executing a set of instructions allows each variable (also known as a virtual register) involved with the instructions to be allocated to a physical register. The embodiments achieve this by monitoring the physical registers to which a variable may be allocated and determining whether a variable no longer has any options for the physical registers to which it may be allocated. When a variable has no options for the physical registers to which it may be allocated, the instruction schedule is changed by unscheduling one or more currently scheduled instructions.

An instruction schedule produced by embodiments of the invention allow a physical register to be allocated to each variable. During the scheduling process, the instructions are scheduled but may then be unscheduled (so that a different schedule is generated) if there is a variable to which no physical register may be allocated. This avoids unnecessary use of slow memory, thereby increasing the overall speed of execution of the set of instructions.

The invention claimed is:

1. A software pipelining method for generating a schedule for executing a plurality of instructions on a processor, the plurality of instructions involving one or more virtual registers, the processor having one or more physical registers, the method comprising the steps of:
   scheduling each of the plurality of instructions;
   determining, dynamically on an instruction by instruction basis for each of the instructions in the plurality of instructions, whether there is a virtual register for which there is less than a threshold number of physical registers to which the virtual register may be allocated in a currently scheduled instruction; and
   unscheduling the currently scheduled instruction associated with the virtual register while leaving other instructions of the plurality of instructions as scheduled when there is less than the threshold number of physical registers to which that the virtual register may be allocated.

2. A method according to claim 1, in which the step of determining whether there is the virtual register for which there is less than the threshold number of physical registers to which the virtual register may be allocated comprises determining whether there is no physical register to which the virtual register may be allocated.

3. A method according to claim 1, in which the step of determining is performed each time an instruction is scheduled.

4. A method according to claim 1, comprising the step of:
for each of the one or more virtual registers, storing an indicator associated with the virtual register, the indicator indicating which of the one or more physical registers the virtual register may be allocated to;
wherein the step of determining is dependent upon the indicator associated with each of the one or more virtual registers.

5. A method according to claim 4, comprising the step of:
initializing the indicator associated with the virtual register to indicate that the virtual register may be allocated to a physical register only if, for each instruction involving that virtual register, that instruction may use the physical register for the virtual register.

6. A method according to claim 4, comprising the step of:
updating the indicator associated with the virtual register in accordance with a constraint on the one or more physical registers to which the virtual register may be allocated, the constraint resulting from two or more instructions being scheduled for execution at a same time, at least one of the instructions involving the virtual register.

7. A method according to claim 6, comprising the step of:
when an instruction is unscheduled, re-initializing the indicator associated with the virtual register and updating the indicator in accordance with the constraint on the one or more physical registers to which the virtual register may be allocated, the constraint resulting from two or more instructions being scheduled for execution at a same time, at least one of the instructions involving the virtual register.

8. A method according to claim 1, comprising the steps of:
having generated a schedule, determining whether each of the one or more virtual registers may be allocated to a physical register to which no other virtual register is to be allocated; and
generating a different schedule when the virtual register cannot be allocated to the physical register to which no other virtual register is to be allocated.

9. A method according to claim 1, in which the software pipelining method is performed in accordance with iterative modulo scheduling.

10. A method according to claim 9, in which the iterative modulo scheduling comprises detecting whether there is a resource conflict between two or more instructions that have been scheduled and unscheduling the currently scheduled instruction when the resource conflict has been detected, wherein simulating the resource conflict when there is less than the threshold number of physical registers to which the virtual register may be allocated.

11. A non-transitory computer readable medium comprising a plurality of instructions to manipulate a processor, the plurality of instructions when executed by the processor cause the processor to perform the steps comprising:
scheduling each of a plurality of instructions;
determining, dynamically on an instruction by instruction basis for each of the instructions in the plurality of instructions, whether there is a virtual register for which there is less than a threshold number of physical registers to which the virtual register may be allocated in a currently scheduled instruction; and
unscheduling the currently scheduled instruction associated with the virtual register while leaving other instructions of the plurality of instructions as scheduled when there is less than the threshold number of physical registers to which that the virtual register may be allocated.

12. A method according to claim 2, in which the step of determining is performed each time an instruction is scheduled.

13. A method according to claim 2, comprising the step of:
for each of the one or more virtual registers, storing an indicator associated with the virtual register, the indicator indicating which of the one or more physical registers that the virtual register may be allocated to;
wherein the step of determining is dependent upon the indicator associated with each of the one or more virtual registers.

14. A method according to claim 3, comprising the step of:
for each of the one or more virtual registers, storing an indicator associated with the virtual register, the indicator indicating which of the one or more physical registers that the virtual register may be allocated to;
wherein the step of determining is dependent upon the indicator associated with each of the one or more virtual registers.

15. A method according to claim 5, comprising the step of:
updating the indicator associated with the virtual register in accordance with a constraint on the one or more physical registers to which the virtual register may be allocated, the constraint resulting from two or more instructions being scheduled for execution at a same time, at least one of the instructions involving the virtual register.

16. A method according to claim 2, comprising the steps of:
having generated a schedule, determining whether each of the one or more virtual registers may be allocated to a physical register to which no other virtual register is to be allocated; and
generating a different schedule when the virtual register cannot be allocated to the physical register to which no other virtual register is to be allocated.

17. A method according to claim 3, comprising the steps of:
having generated a schedule, determining whether each of the one or more virtual registers may be allocated to a physical register to which no other virtual register is to be allocated; and
generating a different schedule when the virtual register cannot be allocated to the physical register to which no other virtual register is to be allocated.

18. A method according to claim 4, comprising the steps of:
having generated a schedule, determining whether each of the one or more virtual registers may be allocated to a physical register to which no other virtual register is to be allocated; and
generating a different schedule when the virtual register cannot be allocated to the physical register to which no other virtual register is to be allocated.

19. A method according to claim 2, in which the software pipelining method is performed in accordance with iterative modulo scheduling.

20. A method according to claim 3, in which the software pipelining method is performed in accordance with iterative modulo scheduling.

* * * * *